United States Patent Office  
3,450,054  
Patented June 17, 1969

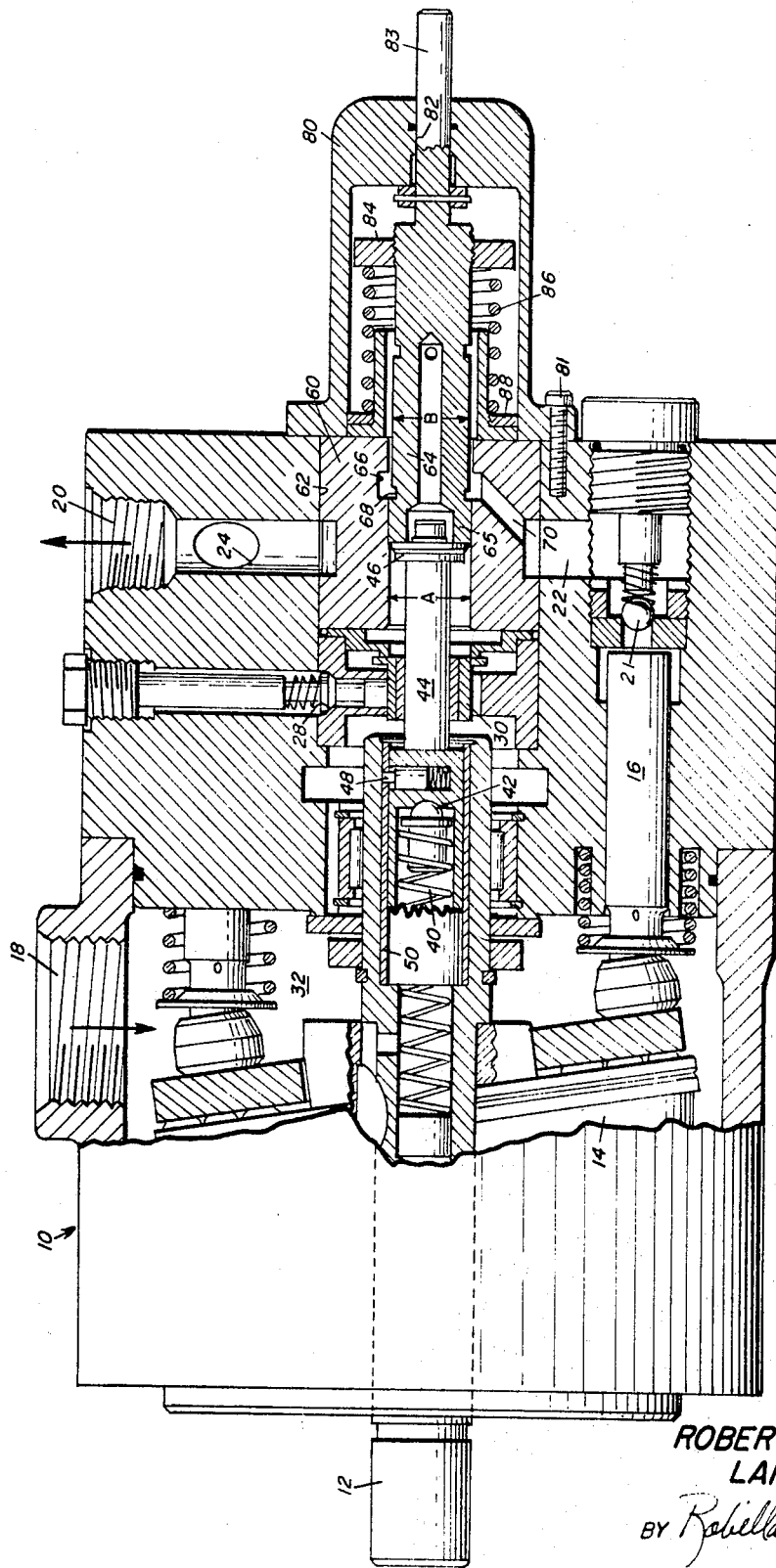

3,450,054
POWER LIMITER
Larry E. Halwas, Pewaukee, and Robert L. Behrens, Waukesha, Wis., assignors to Applied Power Industries, Inc., Menomonee Falls, Wis., a corporation of Wisconsin
Filed Dec. 5, 1966, Ser. No. 599,227
Int. Cl. F04b 49/08, 1/14
U.S. Cl. 103—42                2 Claims

ABSTRACT OF THE DISCLOSURE

A hydraulic pumping apparatus having a variable flow control, a fluid pressure chamber in which changes of pressure will adjust the flow control and a passageway communicating motor system pressures to this chamber.

---

This invention relates generally to a hydraulic pumping mechanism and more particularly relates to means for automatically adjusting the flow of a variable volume pump by providing means to detect and compensate for work load pressure.

Hydraulic assist drive means have found wide acceptance in wheeled vehicles. Tractors and other vehicles adapted for dealing with rough terrain and relative heavy work loads often are equipped with a front wheel hydraulic assist drive means. The advantages of having four wheel drive are obvious. In such assist arrangements the pump of the hydraulic system is driven by a power output shaft from the prime mover engine. Under normal operating conditions, when engine speed in increased, vehicle speed increases and when engine speed is reduced, vehicle speed decreases. Since the hydraulic pump is driven directly by the engine, the speed (a function of fluid delivered) at which the power assist motors are driven is directly proportional to engine speed. Therefore, hydraulic assists of the type described have an inherent ability for accommodating proportional changes in engine and vehicle speeds. However, there are conditions when vehicle speed decreases without a corresponding decrease in engine speeds. For example, when there is a vehicle slowdown caused by slippage of the prime traction wheels. As vehicle speed decreases because of such slipping, the pressure (torque) at the assist motors will rise. In order to maintain the horsepower at the assist wheels constant, the fluid volume (speed) available to the motors must be reduced. It is a primary object of this invention to provide a hydraulic pump which will automatically adjust its fluid output in response to detected pressures at the fluid motors in order to maintain horsepower at the fluid motors constant.

Since it is known to the art to have auxiliary equipment for use with variable volume fluid pumping apparatus which can vary the pump output in accordance with detected fluid pressure, it is another objective of this invention to provide such a capability without the use of auxiliary sensing equipment.

Another important objective of this invention is to provide a pumping system which can be adapted to have automatic variable flow by detecting fluid output pressures within the pump itself.

Another important objective of this invention is to provide means by which variable flow dependent on fluid pressure requirements as developed by various work loads is equipped with a manual override.

A still further objective of this invention is to provide a fluid pump of a type having means to initially adjust for normal fluid requirements and to include means by which the variable flow will be present regardless of the initial fluid requirement setting.

Another important objective of this invention is to provide a novel means for accomplishing the above objectives which are readily adaptable to pumps of known construction.

These and other objectives of the invention will be more readily understood when taken in view of the following specification and drawing which is a longitudinal cross sectional view of the pump interior.

Referring now to the drawing in detail, the numeral 10 indicates the pump housing of this invention. The pump is of the axial type in which a power driven shaft 12 is rotated by an exterior source such as an internal combustion engine of a prime mover. The shaft in turn rotates a swash plate 14. The housing carries a plurality of pistons 16 which reciprocate as a result of the rotation of cam plate 14 in a manner well known to the art. There is a fluid intake at 18 and a fluid output at 20. The output 20 can lead to a hydraulic motor for driving an auxiliary wheel assist for the prime mover.

The output caused by the reciprocation of pistons 16 is exhausted through check balls 21 and thence into annular chamber 22 which is communicated to the pump output 20 by interconnecting slots 24.

The pump has the capacity for variable flow by way of bypass return poppets 28 used in combination with an eccentric cam surface 30. In general the poppets act as a bypass to oil intake chamber 32 by particular phasing with the piston pumping stroke. A more precise manner of developing variable flow in this manner can be more readily determined by a reading of the Reissue Patent 25,850 issued to Stewart on Sept. 7, 1965. The essence of the instant invention can be described for use with pumps of this type; namely, pumps where movement of a stem or other movable member will vary fluid output.

Returning now to the drawing, it is seen that a spring 40 urges a cap 42 to the right. Extending longitudinally from the forward end of the cap is a slidable cam carrying member 44 which is terminated by an enlarged flange 46. Extending radially from the cap is a spring-urged pin 48 riding in a helical groove 49 formed in a sleeve member 50. Movement of the pin 48 relative to the sleeve 50 will cause the cam surface 30 to vary its relationship with the pumping stroke of the piston and thereby provide variable flow. This concept is fully disclosed in the above-identified Stewart patent. As used with pumps of this type. the present invention relates to the means for rotating the cam to its desired relationship with the pumping stroke as influenced by circuit loads.

For these purposes a sleeve 60 is inserted into a bore 62 formed in the adjusting end of the pump. Slidably received in sleeve 60 is a pressure sensing member 64. An interior groove 66 is formed in sleeve 60 and is disposed opposite a groove 68 formed in the periphery of member 64. A passageway 70 communicates the output fluid pressure in chamber 22 to the annular chamber formed by grooves 66 and 68.

A close inspection of member 64 and particularly the portion near the groove 68 discloses that the diameter of its head portion 65 at A is greater than the body diameter B and, therefore, fluid pressures within the chamber will have resulting hydraulic force tending to push the member 64 to the left against the bias of spring 40.

This pressure differential will cause the inner end of the member 64 to bear against the flange 46 and carry member 44 to the left. The resulting rotation of the cam surface 30 caused by the interaction of the pin 48 riding in the helical groove will be in a direction to cause increased fluid flow through the bypass valves during the pumping strokes of the piston.

A cap member 80 is secured to the end of the pump by a plurality of bolts 81. The cap member is bored at 82 and slidably receives a manual override stroking member 83. The stroking member has an abutment disc 84 threadably received thereon. A compression spring 86 has one surface engaging the abutment disc 84 and another end abutting a threadable washer 88. The spring 86 works in the same direction as spring 40. The forces of the springs 40 and 86, therefore, work in opposition to the hydraulic dynamic force developed because of the differential areas caused by diameters A and B. Since the disc 84 is threadably received on the member 83, the bias developed in spring 86 is adjustable to permit an initial volume setting for a selected system pressure.

In operation, presume that the normal load pressure presented to the pump is increased. This effects an increase in pressure in chamber 22 which is immediately reflected in the annular groove 66. The resulting hydrostatic imbalance moves the member 64 to the left to lessen pump displacement or fluid output. If there is a pressure drop springs 40 and 86 cause member 64 and cam carrier 44 to move to the right and increase pump displacement.

In certain instances, the operator may require minimum flow at low pressure. At his election, the operator at anytime can override the automatic features previously described by manually moving the member 83 in to vary pump displacement. Since the increase in pressure in chamber 22 must be relieved in order to obtain a constant horsepower output, the stroke is to the left for reducing pump displacement.

What has been set forth above is intended primarily as exemplary to enable those skilled in the art in the practice of the invention and it should therefore be understood that, within the scope of the appended claims, the invention may be practiced in other ways than as specifically described.

What is new and therefore desired to be protected by Letters Patent of the United States is:

1. A hydraulic pump comprising, a plurality of cylinders forming pumping chambers, a piston reciprocable in each of said cylinders, rotatable wobble plate means to reciprocate said pistons in suction and discharge strokes, a fluid inlet chamber for admitting fluid to said pumping chambers during a suction stroke of their respective piston, an outlet port in fluid communication with said pumping chambers through which pressure fluid is dischargeable during a piston discharge stroke, fluid bypass means between said pumping chambers and said inlet chamber for diverting fluid pumped by said pistons into said inlet chamber, a variable displacement control means within said pump movable from a minimum displacement position wherein said fluid bypass means communicates said pumping chamber to said inlet chamber throughout the discharge strokes of said pistons to a maximum displacement position wherein said fluid bypass is blocked throughout said discharge strokes dependent on fluid pressure in said outlet port, said control means comprising a piston member reciprocably received in a bore in the pump housing and rotatable with said wobble plate means, cam means carried by said piston member for opening said bypass means, a control member having one end abutting said piston member, a pressure chamber spanning said control member and in fluid communication with said outlet port and biasing means arranged on one side of said control means urging the latter toward its maximum displacement position.

2. The invention as described in claim 1 wherein said control member includes a first portion and a second portion of reduced diameter, said first and second portions meeting in said pressure chamber and said difference in diameters causing a pressure imbalance in opposition to said biasing means.

References Cited

UNITED STATES PATENTS

| Re. 25,850 | 9/1965 | Stewart | 103—41 |
| 2,745,350 | 5/1956 | Capsek | 103—173 XR |
| 2,867,091 | 1/1959 | Orloff et al. | 103—173 XR |
| 3,074,345 | 1/1963 | Scheflow | 103—173 XR |
| 3,151,561 | 10/1964 | Schlanzky et al. | 103—173 XR |
| 1,952,663 | 3/1934 | Ernst. | |
| 2,669,935 | 2/1954 | Tucker. | |
| 3,009,422 | 11/1961 | Davis. | |
| 3,175,509 | 3/1965 | Kuze. | |

EDGAR W. GEOGHEGAN, *Primary Examiner.*

U.S. Cl. X.R.

60—52, 53; 103—173